United States Patent [19]

Satoh

[11] 4,048,549
[45] Sept. 13, 1977

[54] CIRCUIT FOR ELIMINATING CURRENT NOISES FROM D.C. MOTOR

[75] Inventor: Ken Satoh, Tokyo, Japan

[73] Assignee: Olympus Optical Company, Ltd., Tokyo, Japan

[21] Appl. No.: 580,777

[22] Filed: May 27, 1975

[30] Foreign Application Priority Data

May 30, 1974 Japan .................. 49-62497

[51] Int. Cl.² ........................... H02P 5/16
[52] U.S. Cl. .................. 318/345 F; 307/90; 318/460
[58] Field of Search ........... 318/345 F, 345 CA, 611, 318/629, 460, 345 B; 307/90

[56] References Cited

U.S. PATENT DOCUMENTS

| | | | |
|---|---|---|---|
| 1,490,031 | 4/1924 | Schmidt | 307/90 |
| 3,214,668 | 10/1965 | Brinster | 318/345 F |
| 3,336,517 | 8/1967 | Cain | 318/345 F |
| 3,564,370 | 2/1971 | Catherin | 318/629 |
| 3,737,748 | 6/1973 | Teders | 318/345 CA |

*Primary Examiner*—B. Dobeck
*Attorney, Agent, or Firm*—Ostrolenk, Faber, Gerb & Soffen

[57] ABSTRACT

A circuit for eliminating a.c. noise current which is produced as a result of the interruption of electrical contact between a brush and a commutator of a d.c. motor and comprises a capacitor which applies the noise current to a transistor, which in turn inverts the waveform of the current and applies it in an inverted phase to a power source for the motor, thereby cancelling the a.c. noise.

2 Claims, 3 Drawing Figures

CIRCUIT FOR ELIMINATING CURRENT NOISES FROM D.C. MOTOR

BACKGROUND OF THE INVENTION

The invention relates to a circuit for eliminating current noises produced by a d.c. motor.

In an electrical circuit using a d.c. motor, the waveform of the current flow through the circuit varies as the electrical contact between the brush and commutator of the motor is interrupted during rotation thereof. The variation in the current flow represents an a.c. noise, which may have an adverse influence upon other electrical circuits through the power source. By way of example, in an electroacoustic apparatus such as a tape recorder, the use of a common d.c. source for the tape driving motor and the record and/or playback circuit results in introducing the a.c. noises produced by the motor into the record-playback circuit through the power source, which is then amplified by the associated amplifier to degrade the fidelity of an audio signal. Thus, it should be apparent that the current noises produced by the d.c. motor must be eliminated when a common power source is used for the motor and other electrical circuits.

SUMMARY OF THE INVENTION

It is an object of the invention to provide a circuit for eliminating current noises from d.c. motor by inverting the noise current through a transistor and applying it to an associated power source in the inverted phase.

In accordance with the invention, the above mentioned disadvantage resulting from noise current from the d.c. motor can be overcome with a simple circuit arrangement requiring a reduced number of parts.

DETAILED DESCRIPTION OF THE PREFERRED EMBODIMENTS

Figure 1:
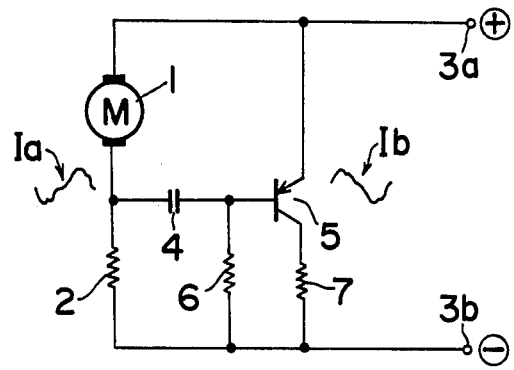
FIG. 1 is a circuit diagram of one embodiment of the circuit according to the invention.

Referring to FIG. 1, a d.c. motor 1 is shown connected in series with a resistor 2 across a d.c. power source having a pair of terminals 3a and 3b of positive and negative polarities, respectively. The motor 1 is driven by a current flow which is controlled by the resistor 2. It will be readily apparent that the rotational speed of the motor can be adjusted by varying the resistance of the resistor 2.

In accordance with the invention, the circuit for eliminating current noises comprises a capacitor 4 having its one end connected with the junction between one terminal of the motor 1 and the resistor 2, a transistor 5 of PNP type having its base connected with the other end of the capacitor, and a bias resistor 6 which is connected across the base and emitter of the transistor 5. The emitter of the transistor 5 is connected with the terminal 3a of the source while its collector is connected with the terminal 3b through a resistor 7.

When the motor 1 is energized, the current through the motor circuit will have a waveform such as shown at Ia, including an a.c. component, because of the intermittent interruption of the electrical contact between the brush and the commutator of the motor 1. In accordance with the invention, the a.c. component of the current Ia is coupled by the capacitor 4 to the base of the transistor 5, whereby it is amplified and inverted by the transistor to produce a current Ib of inverted phase at its collector, which is fed to the power source. Since the current Ib is in inverted phase relationship with respect to the initial current Ia, the a.c. component in the current Ia is cancelled by the corresponding a.c. component in the current Ib. As a result, the a.c. component which causes noises is removed from the current flow to the power source. A complete cancellation of the a.c. component will be achieved if the magnitude of the current Ib is equal and opposite to that of the current Ia. However, in actuality, the use of the capacitor 4 causes a slight phase displacement, which allows some a.c. component to remain in the circuit. Nevertheless, the majority of the a.c. component which gives rise to noises is cancelled, thereby overcoming the above mentioned disadvantage.

Figure 2:
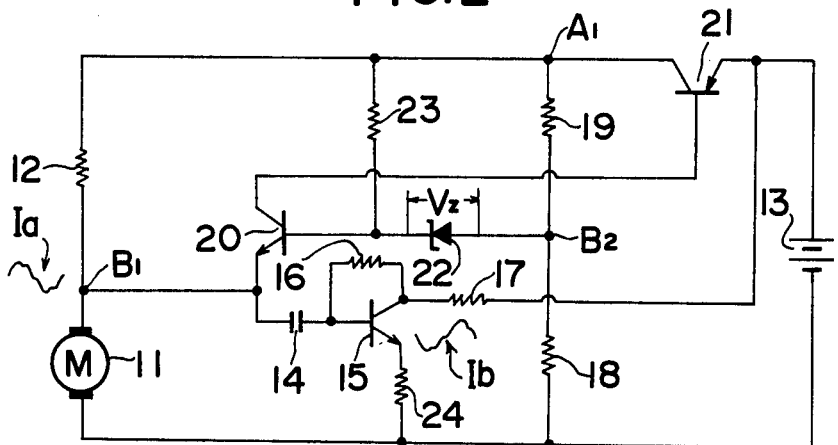
FIG. 2 is a circuit diagram of a d.c. motor drive circuit of servo bridge type to which the invention is applied.

The embodiment shown in FIG. 2 is a d.c. motor drive circuit of known servo bridge type in which a bridge circuit is used to control the motor 11 at a constant speed. Specifically, as is well recognized, the bridge circuit includes three branches each including resistors 12, 18 and 19 and another bridge in which the motor 11 is connected. The back e.m.f. of the motor 11 is detected by a comparison and amplifying transistor 20 which has its emitter connected with the junction $B_1$ between the motor 11 and the resistor 12 and has its base connected through a Zener diode 22 with the junction $B_2$ between the resistors 18 and 19. The collector of the transistor 20 is connected with the base of another transistor 21 which is connected in the current supply path between a power source 13 and the motor 11. Specifically, the emitter of the transistor 21 is connected with the positive terminal of the supply 13 while its collector is connected with the junction $A_1$ between the resistors 19 and 12. The negative terminal of the power source 13 is connected with the junction $A_2$ between the motor 11 and the resistor 18.

Denoting the d.c. resistance of the motor 11 by $Ra$, the respective resistances of the resistors 12, 18 and 19 by $R_1$, $R_2$ and $R_3$, respectively, the bridge circuit including the motor 11 in its one branch will be balanced when the following requirement is satisfied:

$$R_1/Ra = R_3/R_2$$

When such requirement is satisfied, the voltage appearing across the junctions $B_1$ and $B_2$ of the bridge will be proportional to only the rotational speed of the motor 11 and will not depend on the torque load. The constant voltage element or Zener diode 22 constitutes a reference voltage generator together with a resistor 23 which is connected between the junction $A_1$ and the base of the transistor 20. Comparing the sum of the voltage Vz developed across the element 22 and the base-emitter voltage $V_{BE}$ against the voltage developed across the junctions $B_1$ and $B_2$, the transistor 20 operates to control the transistor 21 and hence the current flow through the motor 11 in a manner maintain the difference therebetween zero, thereby keeping a constant speed of the motor 11 automatically.

Where the d.c. power source 13 is used in common with other electrical circuits, the a.c. noises produced by the motor 11 will again adversely influence these other electrical circuits through the power source 13. To avoid such influence, the circuit for eliminating current noises as mentioned above in connection with FIG. 1 can be incorporated into the embodiment shown in FIG. 2. Specifically, the noise elimination circuit includes a capacitor 14 which has its one end connected with the junction $B_1$ and its other end connected with the base of a waveform inverting transistor 15 of NPN type, which has its emitter connected through a resistor 24 with the junction $A_2$. The collector of the transistor 15 is connected through an output resistor 17 with the positive terminal of the power source 13 and is also connected through a bias resistor 16 with its base.

In operation, when the motor 11 is energized, the current $Ia$ containing the a.c. component flows through the motor circuit, and is also applied to the base of the transistor 15 through the capacitor 14. Such current is inverted in its phase by the transistor 15 to provide the current $Ib$ of an inverted phase at its collector, which is fed through the resistor 17 to the power source 13. Because the current $Ib$ is in inverted phase relationship with respect to the current $Ia$, the a.c. component in the current $Ia$ is cancelled by the a.c. component $Ib$, thereby removing noises or a.c. component. As a consequence, the power source 13 can supply a d.c. current to other electrical circuits which is free from a.c. noise components.

Figure 3:
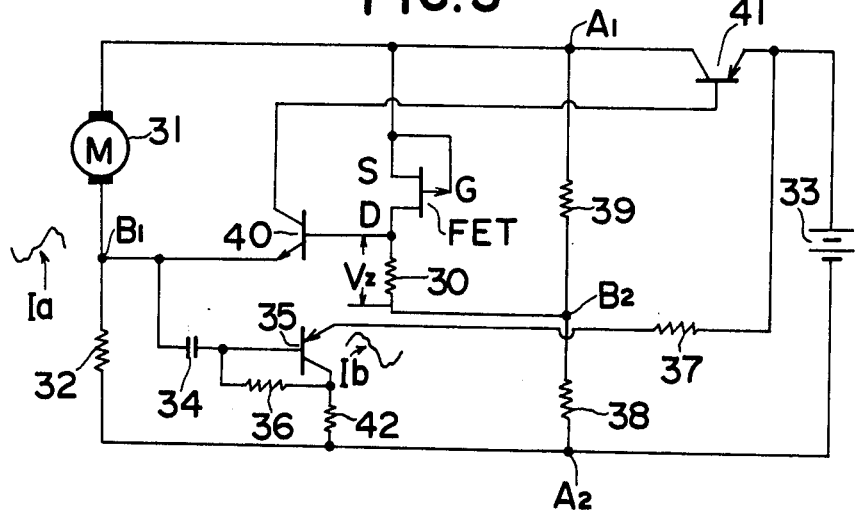
FIG. 3 is a circuit diagram of another d.c. motor drive circuit of servo bridge type to which the invention is applied.

In the embodiment shown in FIG. 3, the noise elimination circuit according to the invention is applied to a d.c. motor drive circuit of servo bridge type including a reference voltage generator which comprises a P-channel FET (field effect transistor) and an output resistor 30. Such motor drive circuit is also known and comprises a bridge circuit having one branch in which a d.c. motor 31 is connected and having three other branches each including resistors 32, 38 and 39. The junction $B_1$ between the motor 31 and the resistor 32 is connected with the emitter of a comparison and amplifying transistor 40 which has its base connected with the drain D of FET. The gate G of FET is connected with its source S which is in turn connected with the junction $A_1$ between the motor 31 and the resistor 39 while the output resistor 30 is connected between the drain D of FET and the junction $B_2$ between the resistors 38 and 39. Another transistor 41 is connected in the similar manner as the transistor 21 in the embodiment shown in FIG. 2. In the present embodiment, the voltage Vz developed across the output resistor 30 serves as a reference voltage, and the rest of the circuit functions in the similar manner as in the previous embodiment.

The noise elimination circuit according to the invention which is employed in the drive circuit of FIG. 3 is connected in shunt with the resistor 32. Specifically, the circuit includes a capacitor 34 which has its one end connected with the junction $B_1$ and its other end connected with the base of a waveform inverting transistor 35 of PNP type, which has its emitter connected through a resistor 37 with the positive terminal of a power source 33. The collector of the transistor 35 is connected through a resistor 42 with the junction $A_2$ and the negative terminal of the power source 33, and a bias resistor 36 is connected across the collector and base of the transistor 35.

The function of the noise elimination circuit shown in FIG. 3 is similar to that achieved by the previous embodiments in that the transistor 35 inverts the waveform of the noise current $Ia$ to produce the current $Ib$ of an inverted phase, which is applied to the power source 33 through the resistor 37. As a consequence, the a.c. component of the current $Ia$ is cancelled by the current $Ib$, removing noise producing a.c. component.

It should be apparent from the foregoing description that the noise elimination circuit according to the invention can be applied to any form or type of d.c. motor drive circuit.

What is claimed is:

1. A circuit for eliminating current noises from a d.c. motor for use in a d.c. motor drive circuit including a bridge circuit having one branch in which the d.c. motor is connected, the bridge circuit including a pair of feed terminals and a pair of detection terminals, a comparison transistor connected across said pair of detection terminals for detecting a change in the back e.m.f. of the motor as the speed thereof varies so as to control a current flow through a feed transistor which is connected intermediate a power source and one of said feed terminals; said noise elimination circuit comprising a capacitor having its one end connected to one terminal of said d.c. motor, a waveform inverting transistor having its base connected with the other end of the capacitor, and a bias resistor for applying a bias voltage to the transistor, said capacitor being effective to apply a.c. noise current developed by the d.c. motor to the base of the transistor, which in turn inverts the noise current and supplies an inverted current to the power source to substantially eliminate said current noises.

2. A circuit for eliminating current noises generated by a D.C. motor, comprising:

first and second terminals;
a D.C. motor connected between said first and second terminals;
first means responsive to an A.C. noise signal generated by said D.C. motor for generating an inverted A.C. signal which is substantially identical to an 180° out of phase with said A.C. noise signal, said first means also for applying said inverted A.C. signal to one of said first and second terminals such that said A.C. noise signal and said inverted A.C. signal are added;
second means connected to one terminal of said D.C. motor for applying said A.C. noise signal to said first means;
said first means comprising a waveform inverting transistor and said second means comprising a capacitor connected between said one terminal of said D.C. motor and the base of said transistor.

* * * * *